United States Patent Office 3,308,148
Patented Mar. 7, 1967

3,308,148
CHLORINE, HYDROXY AND ALKOXY END-
BLOCKED TRIMETHYLSILOXYSILOXANES
James R. Hahn and Charles W. Lentz, Midland, Mich.,
assignors to Dow Corning Corporation, Midland, Mich.,
a corporation of Michigan
No Drawing. Filed Aug. 28, 1963, Ser. No. 305,216
19 Claims. (Cl. 260—448.2)

This invention relates to new chlorine, hydroxy and alkoxy endblocked trimethylsiloxysiloxanes.

More specifically, this invention relates to siloxanes having the general formula

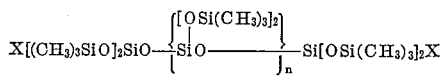

wherein X is a member selected from the group consisting of halogen atoms, alkoxy groups and the hydroxyl group and $n$ is zero or an integer.

The siloxanes of this invention that are liquids are useful, for example, as fluid springs, hydraulic fluids and lubricants. The siloxanes of this invention that are solids are useful, for example, as protective coatings for metals, wood, glass, etc. Such protective films can be formed by dissolving the siloxane in a solvent and then using the solvent solution to cast the film on the metal, wood, glass, etc.

The siloxanes of this invention which contain halogen atoms in the endblocking groups can be prepared by the halogenation of the corresponding hydrogen containing siloxanes. The hydrogen containing siloxanes can be made by cohydrolysis and condensation of $$[(CH_3)_3SiO]_2Si(OCH_3)_2$$

and $[(CH_3)_3SiO]_2HSiOCH_3$. The latter compound can be prepared, for example, by the process illustrated by the following equations:

(1) $H_2SiCl_2 + (CH_3)_2CHOH \longrightarrow H_2Si[OCH(CH_3)_2]_2$ (2)
$$H_2Si[OCH(CH_3)_2]_2 + (CH_3)_3SiCl \xrightarrow[\text{aqueous isopropanol}]{H^+} H_2Si[OSi(CH_3)_3]_2$$

(3) $H_2Si[OSi(CH_3)_3]_2 + Cl_2 \longrightarrow [(CH_3)_3SiO]_2SiHCl$ (4)
$[(CH_3)_3SiO]_2SiHCl + CH_3OH \longrightarrow [(CH_3)_3SiO]_2HSiOCH_3$ An alternative process consists of taking the product of Equation (2) and reacting it as illustrated by the following equation:

(5)
$$H_2Si[OSi(CH_3)_3]_2 + CH_3OH \xrightarrow{Pd} [(CH_3)_3SiO]_2HSiOCH_3$$

The hydroxylated and alkoxylated siloxanes of this invention can be prepared from the halogenated siloxanes of this invention by hydrolysis and alcoholysis reactions respectively.

There are other processes for preparing the siloxanes of this invention. Some of these other processes are particularly preferred for the preparation of specific lower siloxanes of this invention and are illustrated in the examples.

In order that those skilled in the art can better understand how the present invention can be practiced, the following examples are given by way of illustration and not by way of limitation.

Example 1

201 g. of

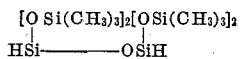

and 42.5 cc. of $(CH_3)_3SiCl$ were mixed in a flask. This mixture was made dark by covering the flask with aluminum foil. The mixture was cooled with ice and water, the temperature of the reaction being held below 0° C. during the chlorination. Chlorine was added to the mixture with stirring at a rate of 100 cc. per minute for about two hours through a gas dispersion tube. The HCl evolved was collected with a water scrubber. Analysis of the product by gas-liquid chromatography showed that about a 87 percent yield of the siloxane

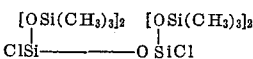

has been obtained.

Example 2

24.5 cc. (96.4% pure) of

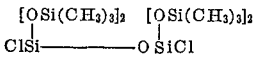

25 cc. of toluene and 25 cc. of tetrahydrofuran were mixed with 7 cc. of concentrated ammonium hydroxide in 43 cc. of water. This mixture was then agitated for a few minutes. The water layer tested alkaline. The water layer was then separated. The organic layer was then washed with a one percent acetic acid solution followed by several water washes and then filtered. Analysis of the product by gas-liquid chromatography showed that about an 80 percent yield of the siloxane

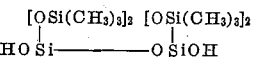

had been obtained.

Example 3

172 g. of

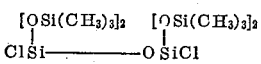

was mixed with 175 cc. of toluene and 175 cc. of tetrahydrofuran. To the foregoing mixture, 408 cc. of an ammonium hydroxide solution (about 1.65 N) was added and stirred for a few minutes. The water layer was slightly alkaline. After stirring for about 30 minutes, the water layer was separated. Then 100 cc. of .1 N HCl was diluted to 400 cc. was used to wash the solution. This acid wash was then repeated two more times. Next two washes with water were made and then the toluene was stripped off. The remaining liquid was fractionated with 96.5 g. of pure

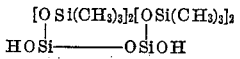

being obtained at 105.5° C. and about .7 mm. pressure. The structure of this material was confirmed by infrared analysis.

Example 4

About 11 g. of laumontite, which is $CaAl_2Si_4O_{12} \cdot 4H_2O$, was ground to pass a 100 mesh screen. Then 10 g. of the ground material was added to a mixture of 150 ml. of HCl, 125 g. of ice, 300 ml. of isopropyl alcohol and 200 ml. of hexamethyldisiloxane which had been stirring for one hour. The resulting mixture was then stirred for two hours at 25° C. (room temperature). The mixture was distilled to a pot temperature of 130° C. yielding 16.3 g. of crude material. This crude material was placed on a steam bath overnight to evaporate off any remaining hexamethyldisiloxane. 12.3 g. of a mushy product remained. About 12 g. of this mushy product was allowed to stand for 10 days and then filtered yielding 2.8 g. of crystalline solids. Analysis by gas-liquid chromatography showed that the product contained about 74.8 percent of the siloxane $\{[(CH_3)_3SiO]_2SiO\}_4$, the structure of this compound later being confirmed by infrared analysis. The product was then washed three times with methyl alcohol which increased the purity of the above product to about 82 percent. The product was then washed with ethyl alcohol which increased the purity of the product to about 84.4 percent. About 1.2 g. of product was obtained. The structure of this compound was confirmed by infrared analysis. Analysis of the compound for carbon content showed 32.45 percent carbon present compared to the theoretical 32.43 percent that should be present.

*Example 5*

When the product of Example 1 is treated with the alcohols listed below, the indicated siloxanes are obtained.

Alcohol: Siloxane

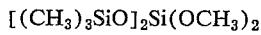

CH$_3$OH _____ CH$_3$OSi————OSiOCH$_3$

C$_2$H$_5$OH _____ C$_2$H$_5$OSi————OSiOC$_2$H$_5$ (CH$_3$)$_2$CHOH _____ (CH$_3$)$_2$CHOSi————OSiOCH(CH$_3$)$_2$

C$_4$H$_9$OH _____ C$_4$H$_9$OSi————OSiOC$_4$H$_9$

*Example 6*

Cohydrolysis and condensation of $$[(CH_3)_3SiO]_2Si(OCH_3)_2$$

and $[(CH_3)_3SiO]_2HSiOCH_3$ yields siloxanes having the formula

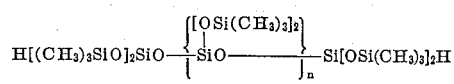

wherein $n$ is an integer, that is, 1, 2, 3, 4, 5, 10, 15, 25, 50, 100 and 1500.

Chlorination of these siloxanes, employing the process of Example 1, yields the corresponding chlorine endblocked siloxanes having the formula

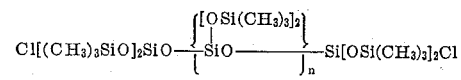

where $n$ has the individual values shown for the H endblocked materials. Corresponding siloxanes wherein bromine, iodine or fluorine atoms replace the chlorine atoms can also be prepared.

Hydrolysis of the chlorine containing siloxanes, supra, yields the corresponding hydroxy endblocked siloxanes having the formula

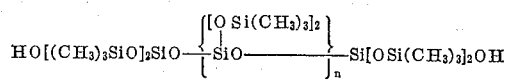

where $n$ has the individual values shown for the above H ended siloxanes.

Alcoholysis of the chlorine containing siloxanes, supra, yields the corresponding alkoxy endblocked siloxanes having the formula

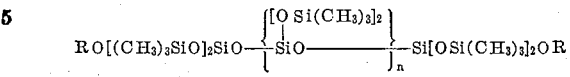

wherein R is an alkyl group corresponding to the alcohol employed in the reaction and $n$ has the particular values shown for the H ended siloxanes. Particularly preferred alcohols to be employed in the alcoholysis reaction are those containing from 1 to 4 carbon atoms, although any alcohol can be employed. Thus, methyl, ethyl, propyl and butyl alcohols are preferred alcohols.

That which is claimed is:

1. Siloxanes having the general formula

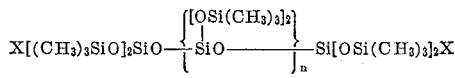

wherein:

X is a member selected from the group consisting of halogen atoms, alkoxy groups and the hydroxyl group, and $n$ is zero or an integer.

2. The siloxanes of claim 1 wherein $n$ is 0.
3. The siloxanes of claim 2 wherein X is a halogen atom.
4. The siloxane of claim 3 wherein X is a chlorine atom.
5. The siloxane of claim 2 wherein X is a hydroxyl group.
6. The siloxane $\{[(CH_3)_3SiO]_2SiO\}_4$.
7. The siloxanes of claim 2 wherein X is an alkoxy group.
8. The siloxanes of claim 7 wherein the alkoxy group contains from 1 to 4 carbon atoms.
9. The siloxane of claim 8 wherein the alkoxy group is a methoxy group.
10. The siloxanes of claim 1 wherein $n$ is an integer.
11. The siloxanes of claim 10 wherein X is a halogen atom.
12. The siloxanes of claim 11 wherein X is a chlorine atom.
13. The siloxane of claim 12 wherein $n$ is 1.
14. The siloxane of claim 10 wherein X is a hydroxyl group.
15. The siloxane of claim 14 wherein $n$ is 1.
16. The siloxane of claim 10 wherein X is an alkoxy group.
17. The siloxane of claim 16 wherein the alkoxy group contains from 1 to 4 carbon atoms.
18. The siloxane of claim 17 wherein the alkoxy group is a methoxy group.
19. The siloxane of claim 18 wherein $n$ is 1.

No references cited.

TOBIAS E. LEVOW, *Primary Examiner.*

P. F. SHAVER, *Assistant Examiner.*